United States Patent
Zingale et al.

(10) Patent No.: US 8,547,855 B1
(45) Date of Patent: Oct. 1, 2013

(54) METHOD AND APPARATUS TO SCHEDULE MULTIPLE PROBES FOR ACTIVE OR PASSIVE MONITORING OF NETWORKS

(75) Inventors: Tom Zingale, Santa Cruz, CA (US); Vishnu Kant Varma, Santa Clara, CA (US); Emmanuel Tychon, Fexhe-le-Haut-Clocher (BE); Wenwei Weng, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1281 days.

(21) Appl. No.: 11/277,058

(22) Filed: Mar. 21, 2006

(51) Int. Cl.
| | |
|---|---|
| H04L 12/24 | (2006.01) |
| G06F 15/173 | (2006.01) |
| H04W 24/00 | (2009.01) |
| H04W 24/02 | (2009.01) |
| H04W 24/04 | (2009.01) |
| H04W 24/06 | (2009.01) |
| H04W 24/08 | (2009.01) |
| H04W 24/10 | (2009.01) |

(52) U.S. Cl.
CPC ............. H04L 41/142 (2013.01); H04L 41/14 (2013.01); H04L 41/145 (2013.01); H04L 41/147 (2013.01); *H04W 24/00* (2013.01); *H04W 24/02* (2013.01); *H04W 24/04* (2013.01); *H04W 24/06* (2013.01); *H04W 24/08* (2013.01); *H04W 24/10* (2013.01)
USPC ........ 370/252; 370/241; 370/241.1; 709/223; 709/224

(58) Field of Classification Search
CPC ..... H04L 41/14; H04L 41/142; H04L 41/145; H04L 41/147; H04W 24/00; H04W 24/02; H04W 24/04; H04W 24/06; H04W 24/08; H04W 24/10
USPC .......... 370/395.4, 241, 241.1, 252; 709/223, 709/224
See application file for complete search history.

(56) References Cited

U.S. PATENT DOCUMENTS

| | | | | | |
|---|---|---|---|---|---|
| 5,164,941 | A | * | 11/1992 | Delaney et al. ............... | 370/447 |
| 5,559,801 | A | * | 9/1996 | Lo ................................ | 370/412 |
| 5,682,384 | A | * | 10/1997 | Zarros ........................... | 370/394 |
| 6,028,847 | A | * | 2/2000 | Beanland ..................... | 370/252 |
| 6,198,722 | B1 | * | 3/2001 | Bunch .......................... | 370/229 |

(Continued)

OTHER PUBLICATIONS

V. Paxson, G. Almes, J. Mandavi, M. Mathis, "Framework for IP Performance Metrics", RFC2330, May 1998.*

(Continued)

*Primary Examiner* — Ayaz Sheikh
*Assistant Examiner* — Tarell Hampton
(74) *Attorney, Agent, or Firm* — Schwegman, Lundberg & Woessner, P.A.

(57) ABSTRACT

An apparatus and method for scheduling multiple probes for monitoring of a network is disclosed. The method comprises identifying a group of multiple probes to be deployed over an IP network, each of the multiple probes measuring different performance metrics in the network. A schedule period is also identified, in which to schedule the deployment of the multiple probes in the group. An even or random mode of scheduling may be specified. In response the even mode of scheduling, the apparatus may schedule the deployment of the multiple probes in the defined group periodically in the schedule period and/or schedules the group of probes periodically. Alternatively, in response to the random mode of scheduling, the scheduling apparatus may schedule the deployment of each of the multiple probes in the defined group at random intervals and/or schedules the group of probes randomly.

25 Claims, 5 Drawing Sheets

(56) References Cited

U.S. PATENT DOCUMENTS

| | | | |
|---|---|---|---|
| 6,430,160 B1* | 8/2002 | Smith et al. | 370/252 |
| 6,662,223 B1 | 12/2003 | Zhang et al. | |
| 6,757,255 B1* | 6/2004 | Aoki et al. | 370/252 |
| 6,778,536 B1* | 8/2004 | Ofek et al. | 370/395.4 |
| 6,845,100 B1* | 1/2005 | Rinne | 370/395.43 |
| 6,868,094 B1 | 3/2005 | Bordonaro et al. | |
| 7,013,255 B1* | 3/2006 | Smith, II | 703/21 |
| 7,286,482 B2* | 10/2007 | Charcranoon | 370/251 |
| 7,299,294 B1* | 11/2007 | Bruck et al. | 709/235 |
| 7,460,543 B2* | 12/2008 | Malik et al. | 370/395.4 |
| 7,483,570 B1* | 1/2009 | Knight | 382/186 |
| 7,860,965 B1* | 12/2010 | Bain et al. | 709/224 |
| 7,969,905 B1* | 6/2011 | Ciavattone | 370/252 |
| 8,433,784 B2* | 4/2013 | Kumar et al. | 709/224 |
| 2002/0006115 A1* | 1/2002 | Hedayat et al. | 370/252 |
| 2003/0061017 A1* | 3/2003 | Dotaro et al. | 703/14 |
| 2003/0093267 A1* | 5/2003 | Leichtling et al. | 704/215 |
| 2003/0115321 A1* | 6/2003 | Edmison et al. | 709/224 |
| 2003/0117959 A1* | 6/2003 | Taranov | 370/241 |
| 2004/0032857 A1* | 2/2004 | Tannan | 370/351 |
| 2004/0236866 A1* | 11/2004 | Dugatkin et al. | 709/224 |
| 2004/0243335 A1* | 12/2004 | Gunawardena et al. | 702/116 |
| 2005/0102413 A1* | 5/2005 | Binns | 709/232 |
| 2005/0108379 A1* | 5/2005 | Gray et al. | 709/223 |
| 2005/0226263 A1* | 10/2005 | Panigrahy et al. | 370/419 |
| 2006/0023691 A1* | 2/2006 | Franchuk et al. | 370/351 |
| 2006/0039370 A1* | 2/2006 | Rosen et al. | 370/389 |
| 2006/0146703 A1* | 7/2006 | Cha et al. | 370/229 |
| 2006/0198352 A1* | 9/2006 | Bruck et al. | 370/347 |
| 2008/0140063 A1* | 6/2008 | Miller et al. | 606/33 |

OTHER PUBLICATIONS

V. Raisanen, G. Grotefeld, A. Morton, Network performance measurement with periodic streams, Internet proposed standard RFC 3432, Nov. 2002.*

Hofmann, U.; Pfeiffenberger, T.; Hechenleitner, B., "One-way-delay measurements with CM toolset," Performance, Computing, and Communications Conference, 2000. IPCCC '00. Conference Proceeding of the IEEE International , vol., No., pp. 41,47, Feb. 2000.*

"Cisco IOS IP Service Level Agreements", [online]. (c) 1992-2005 Cisco Systems, Inc. [archived Mar. 5, 2005]. Retrieved from the Internet: <URL:http://web.archive.org/web/20050305223056/www.cisco.com/warp/public/732/Tech/nmp/ipsla/>, 1 pg.

"IP SLAs Random Scheduler", Cisco Systems, Inc., San Jose, CA, (2005), 10 pgs.

Almes, G., et al., "A One-Way Delay Metric for IPPM", *Request for Comments: 2679*, Network Working Group,(Sep. 1999), 19 pgs.

Almes, G., et al., "A One-Way Packet Loss Metric for IPPM", *Request for Comments: 2680*, Network Working Group, (Sep. 1999), 15 pgs.

Paxson, V., et al., "Framework for IP Performance Metrics", *Request for Comments: 2330*, Network Working Group, (May 1998), 38 pgs.

Raisanen, V., et al., "Network Performance Measurement With Periodic Streams", *Request for Comments: 3432*, Network Working Group, (Nov. 2002), 22 pgs.

* cited by examiner

METHOD AND APPARATUS TO SCHEDULE MULTIPLE PROBES FOR ACTIVE OR PASSIVE MONITORING OF NETWORKS

TECHNICAL FIELD

The present application relates to performance monitoring in network systems, for example in Internet protocol (IP) network systems in which real-time applications such as voice over Internet protocol (VoIP) or other time-sensitive data are sent in packets from a server to a client or vice versa.

BACKGROUND

Network applications such as virtual private network (VPN), voice over IP (VoIP) or voice over frame relay (VOFR) network may require an IP service provider (ISP) to monitor data packet loss in a network and/or inter-packet jitter (inter-packet latency in arrival time). Such network applications may be required as a part of a service level agreement (SLA) between an ISP and a user/client. The service provider needs a way to measure data packet jitter, latency and loss and the users/clients need a way to monitor data packet jitter and loss to ensure they are getting the level of service the ISP agreed to provide.

The use of real-time applications has made it essential that the performance monitoring applications which actively or passively probe the network should do so in a manner which is reliable and in a manner that attempts to overlap with the underlying network characteristics, thereby to observe network performance degradations as they happen.

Although the simplest way to collect performance parameters from the network is by conducting periodic sampling of the network, at regular intervals, this type of scheduling of probes may be insufficient. The main reason for this is that the underlying network may also exhibit a periodic nature, e.g. periodic routing updates, which may make it highly probable that only a non-representative part of the network characteristic will be captured or observed.

Prior art systems schedule operations or probes at fixed intervals, and may further vary the inter-packet delay, for example the delay between packets forming one monitoring probe. These methods have proved to be insufficient and too cumbersome to efficiently monitor network characteristics. It has further been found that prior art systems may be unreliable for jitter measurements.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The present application relates to method and apparatus to schedule multiple probes for active or passive monitoring of IP networks.

As background, for example, in a network such as a VoIP or VoFR network, voice is digitized and packetized for transmission over the network in accordance with what will be referred to herein as a datagram-based protocol. Under such protocols, there is a potential for having timing-sensitive digitized voice data packets muted variously between the source and the destination. Packetization and differential routing of data packets in accordance with a datagram-based protocol is beneficial in terms of optimizing use of bandwidth, but creates a risk that voice data packets may arrive at the destination out of sequence due to different routing path delays or latencies. Such out-of-sequence arrival of voice and other time-sensitive data packets represents a risk of data loss.

Figure 1A:
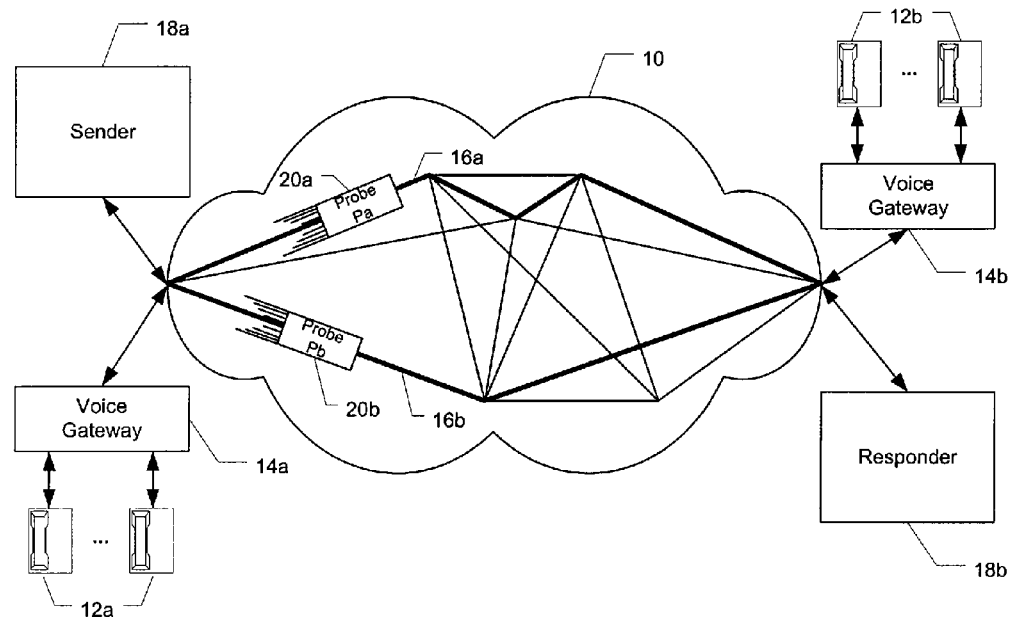
FIGS. 1A and 1B represent a system block diagram of an Internet protocol (IP) network featuring a data packet jitter and loss measurement apparatus in accordance with an example embodiment at slightly different moments in time.
Figure 1B:
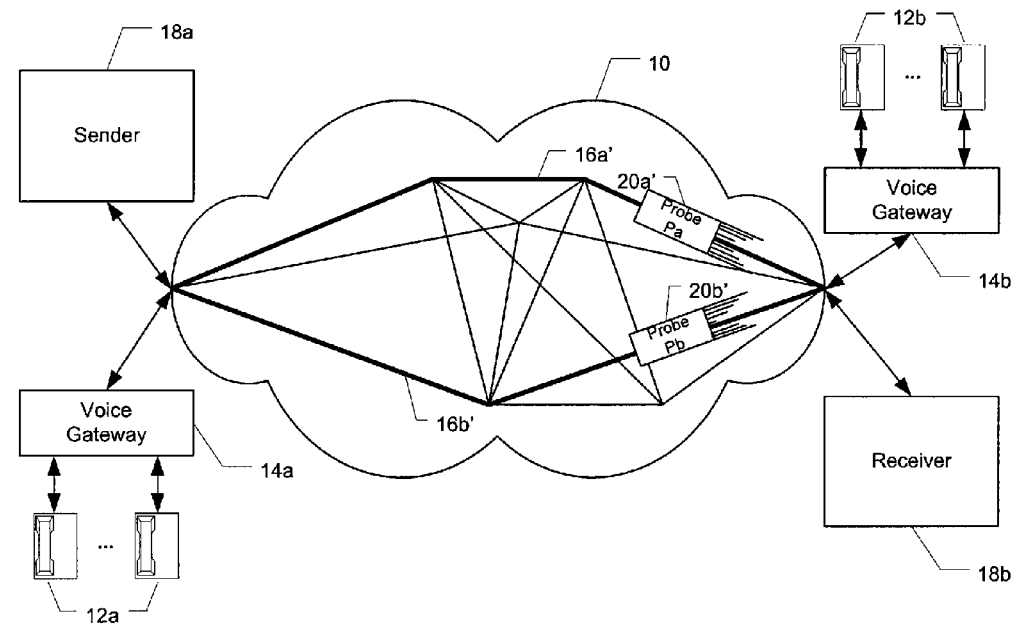

FIGS. 1A and 1B illustrate a network 10 according to an example embodiment, including multiple voice sources, e.g. telephones, 12a and multiple voice destinations, e.g. telephones, 12b connected within the network 10. Either of telephones 12a or 12b is capable of being a source or destination of voice in a two-way conversation. A normal conversation is half-duplex, with one or the other of telephones 12a, 12b being a voice source and with the complementary one of telephones 12a, 12b being a voice destination. Network 10 typically includes thousands or tens of thousands of lines with telephones such as telephones 12a, 12b connected in such a conversation. Telephones 12a, 12b typically are connected to the network via so-called voice gateways 14a, 14b, which perform the digitization, packetization and optional compression of voice signals that renders them network-compatible.

Those of skill in the art know that the network 10 may include hundreds of such gateways 14a, 14b, with each gateway serving hundreds or thousands of such telephones 12a, 12b. The network 10 also typically includes a web of plural routes or paths 16 that represent alternative channels through which voice or other time-sensitive data packets such as multimedia information having an audio component may be routed, as in the burgeoning VPN, VoIP or VoFR networks.

The routes through the network 10 will be understood to impose different latencies, or delays, upon the transmission timing of data packets traveling therethrough. Because different but related data packets, e.g. successive data packets from the same source, may be differently routed through the network, they typically may arrive at the intended destination at different times. Such latency may be caused largely by the amount of time data packets which may reside temporarily in network nodes along the way as part of the normal routing from their source and destination within the network 10.

Those of skill in the art will appreciate that routing within the network is performed by routing software that keeps track of traffic on various data channels. The routing software then assigns bandwidth within such channels. In this manner, the software determines the routing of various data packets through the network to maximize use of network bandwidth while serving as many customers, e.g. telephone callers, Internet users/client and service providers, as possible. It is this desirable flexibility in routing that results inevitably in latencies through the network of variously routed data packets.

Because the latencies among various data packets are not constant, successive data packets from the same source can arrive at the destination out of sequence. Out-of-sequence arrivals of data packets may be treated at the destination as representing data loss, e.g. the later arrival of an earlier data packet may be deemed loss of that late-arriving data packet. By sending a sequence number within at least two successive dedicated probe data packets, the destination of the probe data packets can detect out-of-sequence arrivals and thus can monitor the performance of the network by measuring data packet loss.

By time stamping a dedicated probe data packet at the source, latency through the network may be measured at the destination. By time stamping a probe data packet at the source and also at the destination, and then by echoing the probe data packet back to the source, two-way latency through the network may be measured at the source. By time stamping successive probe data packets, variance in network latencies as between the successive probe data packets may be measured. Such variance will be referred to herein as data packet jitter.

Three example classes of performance metrics may exist. One-way metrics include measures of absolute latency for a data packet through the network, and require only time stamping at the source and time receipting at the destination. One-way metrics also may include measures of relative latency as among two or more data packets, with the same modest requirement. Two-way metrics include measures of absolute latency for a data packet through the network, and require time stamping at the source, time stamping at the destination, echoing at the destination and a simple calculation at the source. Two-way metrics also may include measures of relative latency as among two or more data packets, with the same modest requirement. Thus, data packet jitter may be understood to be detectable without echo, while data packet loss may be understood to require echo for detection.

In either case, the overhead required to measure network performance may be minimal. This may be true even with an active sampling technique whereby dedicated test probe data packets are sent and received over the network.

Referring still to FIG. 1A, a service assurance agent (SAA) 18, which may be seen to include components SAA sender 18a and SAA receiver or responder 18b, may be understood to be any agent coupled to or within a network 10 which performs the data latency and inter-packet jitter performance metrics. It will be appreciated that the SAA 18 may be integrated into the resident network operating system (OS) or may reside in a dedicated or shared server node of the network 10 such as voice gateways 14a, 14b. The SAA 18 may be invoked upon command by the network OS or on demand by quality assurance persons or customers. In an example embodiment, it is invoked by the network OS periodically as a pro-active management and reporting tool.

The SAA sender 18a is so called because it is the initiator of network performance measurements. It will also be understood that voice gateways 14a, 14b and other servers involved in the network metrics may themselves contain dedicated SAA responder 18b software that responds to delay, jitter and loss probes sent by SAA sender 18a software.

FIGS. 1A and 1B illustrate how probe packets Pa and Pb may be sent out over the network 10 and may be routed differently therethrough between the sender 18a and the responder 18b. For example, the probes 20a and 20b (representing the probe data packets Pa and Pb, respectively) are routed respectively along the paths 16a and 16b through the network 10, as shown in FIG. 1A, from the sender 18a to the responder 18b. Probes 20a' and 20b' (representing echo data packets Pa' and Pb', respectively) may be routed respectively along different return paths 16a' and 16b' through network 10, as shown in FIG. 1B, from responder 18b to sender 18a. In FIG. 1B, responder 18b has responded to the probe of sender 18a by echoing nearly identical probes as were received by responder 18b back to sender 18a. Thus FIG. 1B may be seen to represent a moment of time slightly later, e.g. a fraction of a second, than that represented by FIG. 1A.

Those of skill in the art will appreciate how different probes may be defined. For example, probes may be defined to achieve at least one-way or round-trip data packet latency metrics as well as inter-packet jitter and loss metrics. It will be appreciated that in some cases, the accuracy of the metrics is affected by the load on the central processor units (CPUs) of the source router and destination web server.

The SAA 18 may reside on a server node and executes as software, firmware or hardware, all within the spirit and scope of the application. The SAA 18 performs active performance assessment and assurance of the network to which it is connected, thereby to ensure customer satisfaction. In a way, the SAA 18 may act as a router dedicated not to normal network routing of client requests to ISPs or of voice or other time-sensitive data between telephone conversants, but dedicated instead to network performance assurance. Of course, those of skill in the art will appreciate that the SAA 18 uses existing network channels and protocol to measure, for example, a) network data packet latency per direction, b) round-trip network data packet latency, c) inter-packet network jitter and d) data packet loss per direction.

It may also be appreciated that there may be within the network 10 what will be referred to herein as data jitter. Data jitter refers to inter-packet delay variance or variations in transit time between a source and a destination. This is because routers within the network 10 may route packetized data in accordance with traffic demand and channel capacity in an attempt to maximize bandwidth and to minimize response time. As a result, related data packets and even successive data packets may be routed differently through the network 10. This is illustrated in FIG. 1A by a web of routes 16 within the network 10, two typical outgoing paths (from sender to responder) 16a, 16b being highlighted by bold lines making intermediate stops at different switching nodes along the way. Paths 16a, 16b thus represent differential route timing within network 10, since they pass through different numbers of switches each typically imposing delay. It is further illustrated in FIG. 1B by a web of routes 16 within the network 10, two typical incoming or return paths (from responder to sender) 16a', 16b' also being highlighted by bold lines representing differential echo data packet timing.

Also illustrated in FIGS. 1A and 1B is the fact that data packets that are related in some way—e.g. data probes Pa and Pa' or data probes Pb and Pb' related generally as query and echo data—nevertheless may be routed differently within the network 10. Thus, a number of timing variables are introduced by the otherwise-beneficial discretionary routing of data within the network 10.

As between successive data packets, a first data packet may transit the network 10 from source to destination (sender 18a to responder 18b) in a first amount of elapsed time (represented in FIG. 1A by boldface highlighted route 16a). Such routing timing may be measured in milliseconds. A second data packet in the succession of data packets may transit from source to destination in a second amount of elapsed time that is greater or smaller than the first, but still measured in milliseconds. Such is illustrated in FIG. 1A by boldface highlighted route 16b having fewer interposed node switches than route 16a and thus representing a smaller elapsed time. If the route timing of the second packet in succession is slightly larger, then there is no out-of-sequence receipt of the second packet but there may be out-of-sequence receipt of a third packet that arrives ahead of the delayed second packet. Some delay of course is expected and may well represent acceptable network performance. From the example immediately above, delay variance may result in data packet loss because the sequential arrival at the destination as among successive packets is different from the sequence in which they left the source.

If the route timing of the second packet in succession is smaller (as illustrated in FIG. 1A, where path 16b has fewer interposed switch nodes than path 16a,) then there is a risk of data loss since the later-sent packet arrives at the destination before the earlier-sent packet. Again, loss results from out-of-sequence arrival of packets at the destination. Data loss, as opposed to data delay, typically is defined by protocol. For example, respondent routing software at the voice destination 'times out' successive data packets that are separated by more than a given duration, e.g. two seconds, and treats the variance in transit time as a data loss.

In an example embodiment, the present application is directed to enhancing and improving polling of a network for multiple performance metrics and provides a user with the flexibility to schedule operations or the deployment of multiple probes together in groups to measure the performance metrics of the network. In an example embodiment, the present application also provides for the scheduling of the deployment of the group of probes to be in an even mode or a random mode.

Multiple probes may be used to monitor network performance by measuring, for example, performance metrics comprising response time, connect time, jitter (inter-packet delay variance), network resource availability, application performance, throughput and packet loss. (Some of these performance metrics have been described above in more detail.) This may be done by deploying the probes that measure the different performance metrics in groups, in a router. Various types of probes may be supported, for example, Jitter, icmpEcho and udpEcho.

In order to manage a large number of probes, a scheduling apparatus according to an example embodiment may activate a large number of probes through, for example, CLI/SNMP at various times over a specified schedule period.

Figure 2:
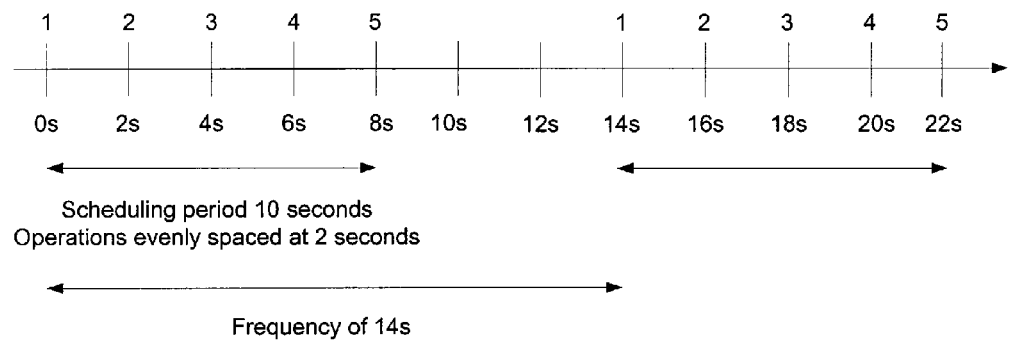
FIG. 2 is a schematic diagram illustrating the scheduling of a group of probes according to an even mode of scheduling in accordance with an example embodiment.

The operations or deployment or activation of the probes may be in an even mode, an example of which mode is shown in FIG. 2, where multiple probes forming part of a group of probes are distributed periodically at intervals equally distributed over the specified example schedule period. The deployment of the group of probes may then be restarted at a specified frequency.

In the example of FIG. 2, five probes, probes 1-5, are deployed in a schedule period of 10 seconds. The schedule period is the time period in which all the probes should be deployed. In this even mode of scheduling, the time between consecutive probes starting may be calculated using the equation "schedule period"/"number of probes"=10/5=2. Therefore, consecutive probes are evenly spaced at 2 seconds in the given example.

Scheduling frequency relates to the frequency at which the schedule period has to be repeated. For example, a scheduling frequency of 14 seconds has been specified for this even mode of probing, and probe 1 is redeployed at 14 seconds.

Figure 3:
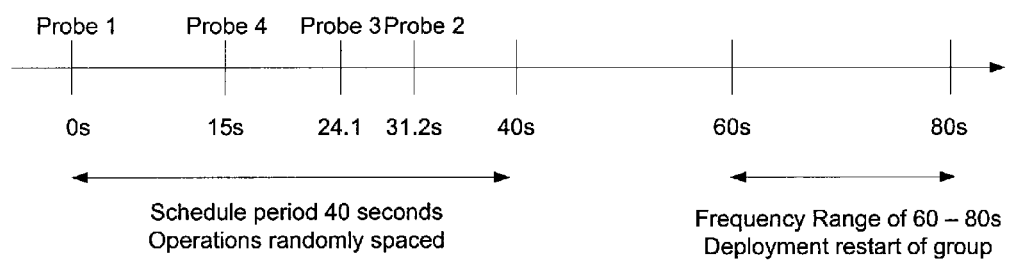
FIG. 3 is a schematic diagram illustrating the scheduling of probes forming part of a group of probes according to a random mode of scheduling in accordance with an example embodiment.

Alternatively, the deployment or activation of the probes may be in a random mode, where multiple probes forming part of a group of probes are deployed randomly over the specified schedule period. The deployment of the group of probes, and the individual probes forming part of the group, may then be restarted at uniformly distributed random frequencies within a specified frequency range. FIG. 3 shows an example of probes being deployed in the random mode, where 4 probes, probes 1-4, are deployed in a schedule period of 20 seconds. In this example random mode of scheduling, probes are deployed at 0, 15 s, 24.1 s and 31.2 s. The scheduling frequency range for this example is 50 to 70 seconds and the redeployment of the probes will commence within this range. It will be appreciated that both in the random mode and the even mode of scheduling the scheduling period and frequency may vary from one embodiment to another.

By scheduling the group of multiple probes randomly, the SAA 18 may report performance or SLA metrics closer to the actual network performance. Further, using the random mode of deployment of probes or polling may inhibit or prevent the polling of probes from deteriorating the conditions of the network. This may be relevant in circumstances where users want to monitor various routes to thousands of endpoints with thousands of probes. In certain embodiments, random scheduling may thus improve the statistical metrics for assessing network performance. Example embodiments may provide the flexibility for the user to probe in a time-efficient way, while still obtaining valid data.

Figure 4:
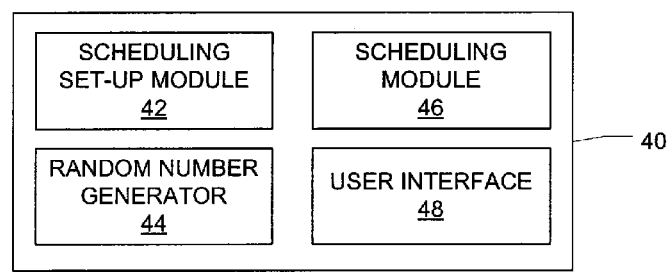
FIG. 4 is a simplified block diagram of a scheduling apparatus in accordance with an example embodiment.

Referring now to FIG. 4, a block diagram of a scheduling apparatus 40 according to an example embodiment is shown. The scheduling apparatus 40 may be a subsystem of SAA 18, and may be responsible for generating schedules of multiple probes for active or passive monitoring of a network, such as an IP network, evenly and/or randomly, according to certain defined parameters. In an example embodiment, the SAA 18 may therefore be in continuous communication with the scheduling apparatus 40 to obtain the scheduling of the next probe, packets of the probe and/or groups of multiple probes, and to deploy them accordingly.

A scheduling set-up module 42 may identify at least one group of multiple probes to be deployed in the network. As mentioned, in an example embodiment the multiple probes which form part of the group may each measure a different performance metric within the IP network, within a specified period. A user may define groups of multiple probes by specifying a group number and entering the different operation or probe identification numbers (ID's) through a user interface (UI) 48.

The scheduling set-up module 42 may identify an even or random mode of scheduling the probes and groups of probes. The scheduling set-up module 42 may identify this mode by receiving information from a user, for example, the user may specify the mode by using the UI 48. If the user does not specify a mode of scheduling, the even mode of scheduling may automatically be selected by the scheduling set-up module 42. Alternatively, the mode of scheduling may be determined by a pre-programmed parameter.

The scheduling set-up module 42 may also identify a schedule period in which to schedule the deployment of the multiple probes in the defined group in the network, whether in even or random mode. As mentioned, the schedule period may be the period of time in which all the probes have to be deployed.

The scheduling set-up module 42 may receive the schedule period from the user, who enters it via the UI 48 or retrieve it from a memory device. The schedule period is used by the scheduling module 46 to either schedule the deployment of the probes in the group periodically or randomly over the schedule period. Depending on the mode of scheduling, the actual start times for the probes may be randomly chosen in a random mode between the 0ms and the end time of the schedule period.

The scheduling set-up module 42 may, in response to an even mode of scheduling being identified, identify a specific frequency as the waiting interval between two deployments of each of the multiple probes in the group. For example, the scheduling set-up module 42 may identify that the deployment of the probes should be restarted at 14 s, as shown in FIG. 2. The user may again define this frequency by using the UI 48, or alternatively the scheduling set-up module may determine the frequency in accordance with predefined parameters. If no frequency is specified, the scheduling set-up module may define the frequency as the schedule period (e.g., a default frequency may be provided).

Alternatively, in response to a random mode of scheduling being identified, the scheduling set-up module 42 identifies a frequency range from which a frequency is randomly selected as the waiting interval between two deployments of each of the multiple probes in the group, or alternatively the waiting time between two consecutive activations or deployments of a given probe. Similar to the other scenarios, the user may also define the range of frequencies by using the UI 48.

Where a deployment frequency range is identified, a minimum and maximum frequency or sampling interval is set. A random frequency may then be randomly selected by the scheduling module 46 in this deployment frequency range (described in more detail below).

The random times to deploy a probe may be of granularity to 0.1 seconds, and therefore, the random unit of time will be rounded to 0.1 second values. The start time of the probes will be chosen to ensure that the random time intervals are uniformly distributed across schedule period.

It will be appreciated, that, to implement a random schedule for the deployment of multiple probes which is completely unpredictable, it is only necessary to specify the deployment frequency range or the rate of sampling. The disadvantage of this approach is that the wait time between two deployments of a given probe may be unbounded, for example the wait time may be very long in certain circumstances. Also, the Internetwork Operating System (IOS) does not recommend the use of floating point arithmetic, as it becomes very difficult to generate random numbers uniformly distributed between 0 and 1.

For this reason the example embodiments provide for bounding the deployment wait times by specifying the schedule period or range and then to generate uniformly distributed random probes in the schedule period. This approach may overcome the unbounded wait time problem but at the same time becomes more predictable. It will be appreciated that a larger range will result in a more random schedule and unpredictability.

The scheduling apparatus 40 further includes a random number generator 44 to generate a random number. This random number generated by the random number generator 44 may be used by a scheduling module 46, described below, in conjunction with various mathematical distribution models to randomly schedule the deployment of the multiple probes, the groups of multiple probes and the inter-packets forming the multiple probes. The random number may be determined by using the random_gen 32 bit( ) function of the util/random.c file.

A scheduling module 46 also forms part of the scheduling apparatus 40. The scheduling module 46, in response to an even mode of scheduling being identified, is to schedule each probe in the group periodically, at a set interval, in the schedule period. The scheduling module 46 may calculate the set intervals, as described above, in accordance with the example of FIG. 2. In this mode of operation, the scheduling module also uses the frequency identified by the scheduling set-up module 44 to deploy the group of probes periodically at the identified frequency.

In response to a random mode of scheduling being identified, the scheduling module 46 may schedule the deployment of each of the multiple probes in the defined group intermittently, at random intervals within the schedule period. The scheduling module 46 calculates the random probe deployment times or intervals for probe deployment within the schedule period for each of the multiple probes by using the generated random number and a mathematical distribution model.

The scheduling module 46 may identify a mathematical distribution such as a uniform distribution, an exponential distribution, a Poisson distribution or any other random distribution. It will be appreciated that the user may select the mathematical distribution model by using the UI 48.

The deployment frequency of a probe may be chosen by the scheduling module 46 in the same way as the random start time of the probe in the schedule period. In doing this, the time interval between two neighboring probes' start times follows, e.g., a Poisson distribution pattern based on Poisson distribution definition, or any other selected mathematical distribution.

For example, the scheduling module 46 may combine the generated random number with the frequency range to calculate the next deployment of a particular probe. The scheduling module 46 uses the random number and "AND"s the random number with the range of frequency. Alternatively, a modulus operation can be done with the range and the result added to the lower of the two frequencies in the range.

The scheduling module 46 may further generate a schedule to randomly deploy a number of packets forming part of each probe. However, this may only be relevant in specific circumstances.

The following example guidelines may apply when identifying the frequency range. The starting value of the frequency range should preferably be greater than the timeout values of all the operations in the group operation.

Also, the starting value of the frequency range (the lower frequency of the deployment frequency range) should be greater than the schedule period. This guideline may ensure that the same operation does not get scheduled more than once within the schedule period. For example, if the schedule period for 3 probes is 20 seconds and the frequency range is 10-30 seconds then there will be a fair probability of one or more probes getting scheduled in the schedule period more than once.

Probe 1 gets scheduled at 0 seconds;
Probe 2 gets scheduled at 11.1 seconds;
Probe 1 again gets scheduled at 13.4 seconds; and
Probe 3 gets scheduled at 19 seconds.

Figure 5:
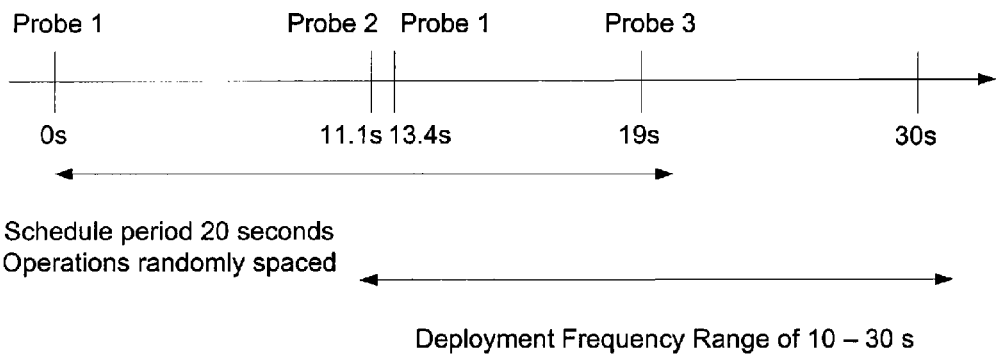
FIG. 5 is a schematic diagram illustrating the scheduling of a number of probes, which scheduling may be avoided by the scheduling apparatus.

This example configuration, as shown in FIG. 5, should be avoided.

The following example guidelines may apply if the random mode is enabled. The individual operations or deployment of probes in a group operation will be uniformly distributed to begin at random intervals over the schedule period. The group of operations restarts at uniformly distributed random frequencies within the specified frequency range. The minimum time interval between the start of each operation in a group operation is 100 milliseconds (0.1 seconds). If the random scheduler option is disabled, the minimum time interval is 1 second, for the even mode of scheduling.

In an example embodiment, only one probe or operation should be scheduled to begin at any given time. If the number of probes is more than the "schedule period (in ms)"/100 ms, the scheduling set-up module will conduct a maximum allowable probe check, and may prevent this from happening. Where the random mode is disabled, and the even mode of scheduling is active, multiple probes can begin at the same time.

The first operation or deployment of a probe in the random mode will begin at 0 milliseconds of the schedule period. Also, the lower of the two frequencies in the deployment frequency range should be more than the timeouts of all the probes configured in the group.

It will be appreciated that, when operating in the random mode, the chronological order in which each of the probes in the group of multiple probes is randomly started in the schedule period may not be in the same order in which the probe IDs or indices of the probes appear in a group. For example, and as shown in FIG. 3, if a group of four probes is started in a schedule period of 40 seconds, then the order in which the probes may be deployed is:

Probe 1 at 0 seconds;
Probe 2 at 31.2 seconds;
Probe 3 at 24.1 seconds; and
Probe 4 at 15 seconds.

The determination of an end of life of a probe when a life time is specified may be problematic to calculate in this application. The way the end of a probe life may be determined for a probe with a constant frequency is by determining whether the sum of number of operations and the skip count has exceeded the maximum number of operations possible in the given lifetime. For example:

$$operation\_count + skipCount < life\_time/frequency,$$

and the way the skipCount may be determined is by the difference of total number of operations that could have taken place in the elapsed time since the start time of the probe and the actual number of operations. For example:

$$skipCount = (elapsed\_time/frequency) - (actual\_operation\_count + skipCount)$$

As can be seen by the example equations above, a large number of calculations are dependent on the constant frequency of the probes. When the probes are randomly scheduled calculation of the skipCount with the existing equations may become virtually impossible, as the frequency is not constant. The calculation of life expiration may also not be possible with the existing methods as the number of probe operations could vary between "life"/"low_frequency" and "life"/"high_frequency". Accordingly, in an example embodiment, in the random mode of scheduling, the life expiration is not to be determined by the frequencies of deployment of the probes but rather on the actual time variables. Therefore, for randomly scheduled probes their life expiration (ageout) would happen when the following statement may be true:

$$Life\_time - elapsedTime\_since\_startTime <= 0.$$

The scheduling apparatus 40 and in particular the scheduling set-up module 42 may be configured manually using CLI or through SNMP. This option provides for the scheduling apparatus 40 being able to operate in two modes, the even scheduling mode and the random scheduling mode. In the even mode of operation, if the deployment frequency is not entered, the frequency of probes may be defaulted to the schedule period.

An example of the configuration steps to be taken to set-up the method in accordance with an example embodiment is now provided:

|  | Command or Action | Purpose |
| --- | --- | --- |
| Step 1 | enable<br>Example:<br>Router> enable | Enables privileged EXEC mode.<br>Enter your password if prompted. |
| Step 2 | configure terminal<br>Example:<br>Router # configure terminal | Enters global configuration mode. |
| Step 3 | ip sla monitor group schedule group-operation-number operation-id-numbers schedule-period seconds [ageout seconds] [frequency [seconds \| range random-frequency-range]] [life {forever \| seconds}] [start-time {hh:mm[:ss] [month day \| day month] \| pending \| now \| after hh:mm:ss}]<br>Example:<br>Router # ip sla monitor group schedule 2 1-3 schedule-period 50 frequency range 80-100 | Specifies the scheduling parameters of a group of IP SLAs operations. To enable the IP SLAs random scheduler option, you must configure the frequency range random-frequency-range keywords and argument. |
| Step 4 | exit<br>Example:<br>Router # exit | Exits global configuration mode and returns to privileged EXEC mode. |

Before scheduling a group of operations, all the probes to be deployed in the group should be configured.

The following is a table with an example of the syntax description for the present application:

| | |
|---|---|
| group-operation-number | Group configuration or group schedule number of the IP SLAs operation to be scheduled. Valid values range from 0 to 65535. |
| operation-id-numbers | The list of IP SLAs operation or probe ID numbers in the scheduled operation group. Indicate ranges of operation ID numbers with a hyphen. Individual ID numbers and ranges of ID numbers are delimited by a comma. For example, enter a list of operation ID numbers in any of the following ways:<br>2, 3, 4, 9, 20<br>10-20, 30-35, 60-70<br>2, 3, 4, 90-100, 105-115<br>The operation-id-numbers argument can include a maximum of 125 characters. |
| schedule-period seconds | Time (in seconds) for which the IP SLAs operation group is scheduled.<br>Valid values are from 1 to 604800 seconds. |
| ageout seconds | (Optional) Number of seconds to keep the operation in memory when it is not actively collecting information. The default is 0 seconds (never ages out). |
| frequency seconds | (Optional) Number of seconds after which each IP SLAs operation is restarted.<br>Valid values are from 1 to 604800 seconds. |
| frequency range random-frequency-range | (Optional) Enables the random scheduler option. The random scheduler option is disabled by default.<br>The uniformly distributed random frequencies at which the group of operations will restart are chosen within the specified frequency range (in seconds). Separate the lower and upper frequency values with a hyphen (for example, 80-100). |
| life forever | (Optional) Schedules the operation to run indefinitely. |
| life seconds | (Optional) Number of seconds the operation actively collects information. The default is 3600 seconds (one hour). |
| start-time | (Optional) Time when the operation starts collecting information. If the start-time is not specified, no information is collected until the start-time is configured or a trigger occurs that performs a start-time now. |
| hh:mm[:ss] | (Optional) Specifies an absolute start time using hours, minutes, and (optionally) seconds. Use the 24-hour clock notation. For example, start-time 01:02 means "start at 1:02 a.m.," and start-time 13:01:30 means "start at 1:01 p.m. and 30 seconds." The current day is implied unless you specify a month and day. |
| month | (Optional) Name of the month to start the operation in. If month is not specified, the current month is used. Use of this argument requires that a day be specified. User can specify the month by using either the full English name or the first three letters of the month. |
| day | (Optional) Number of the day (in the range 1 to 31) to start the operation on. If a day is not specified, the current day is used. Use of this argument requires that a month be specified. |
| pending | (Optional) No information is collected. This is the default value. The operation is enabled but is not actively collecting information. |
| now | (Optional) Indicates that the operation should start immediately. |
| after hh:mm:ss | (Optional) Indicates that the operation should start hh hours, mm minutes, and ss seconds after this command was entered. |

The following example shows how to schedule operations or probes 1 to 3 as a group (identified as group 2), in accordance with the example detailed steps and syntax description provided above. In this example, the operations are scheduled to begin at uniformly distributed random intervals over a schedule period of 50 seconds. The first operation is scheduled to start immediately. The random mode may be enabled and the uniformly distributed random frequencies at which the group of operations will restart may be chosen within the range of 80-100 seconds.

ip sla monitor group schedule 2 1-3 schedule-period 50 frequency range 80-100 start-time now To perform group scheduling for probes to be deployed, the following commands, in accordance with an example embodiment, may be used. Also, to stop the operation and place the operation in the default state of normal scheduling, a "no" form of the command may be used.

ip sla monitor group schedule group-operation-number operation-id-numbers schedule-period seconds [ageout seconds] [frequency [seconds|range random-frequency-range]] [life {forever|seconds}] [start-time {hh:mm[:ss] [month day|day month]|pending|now|after hh:mm:ss}]
    no Ip ala monitor group schedule Although the present application may facilitate scheduling thousands of operations, the caution should be taken while specifying the number of operations, the schedule period, and the operation group frequency to try and avoid any significant CPU impact. For example, a user may schedule 1 to 780 operations or probes at a schedule period of 60 seconds. The command may be as follows:

ip sla monitor group schedule 2 1-780 schedule-period 60 start-time now

The scheduling apparatus may calculate how many operations it should start in each 1-second interval by dividing the number of operations by the schedule period (780 operations divided by 60 seconds, which is 13 operations per second). Operations 1 to 13 in operation group 2 start after 0 seconds, operations 14 to 26 start after 1 second, operations 27 to 40 start after 2 seconds, and the iteration continues until operations 768 to 780 start after 59 seconds. This high value of operations starting at every 1-second interval (especially for jitter operations) can load the CPU to very high values.

Some routers have a maximum recommended value of operations per second. For example, on a Cisco 2600 router, the maximum recommended value of operations per second is 6 or 7 (approximately 350 to 400 operations per minute). Exceeding this value of 6 or 7 operations per second could cause major performance (CPU) impact. The scheduling apparatus may or may not be configured to provide a user with a warning message that a too high number of operations have been elected to start per second.

The scheduling apparatus 40 may further be configured to allow, when a user reboots the router, the scheduling apparatus to schedule the operations in the same order as was done before the reboot. For example, assume the following operation had been scheduled:

ip sla monitor group schedule 2 1-20 schedule-period 40 start-time now

Over a range of 40 seconds, 20 operations have to be started (that is, one operation every 2 seconds). After the system reboots, operation 1 will start at t seconds and operation 2 starts at t+2 seconds, operation 3 starts at t+4 seconds, and so on.

The scheduling apparatus 40 may schedule the maximum number of operations possible without aborting. However, this functionality may skip the probing operations that are already running or those that are not configured and hence do not exist. The total number of operations may be calculated based on the number of operations or probes to be deployed specified in the command, irrespective of the number of operations that are missing or already running.

Also, the scheduling apparatus 40 may display to a user via the UI 48 a message showing the number of active and missing operations. However, these messages may be displayed only if the user schedule operations or probes that are not configured or are already running.

The following example shows how probe deployment operations 3, 4, and 6 to 10 can be scheduled as a group (identified as group 1). In this example, the operations are scheduled to begin at equal intervals over a schedule period of 20 seconds. The first operation or deployment of probes (or set of operations) is scheduled to start immediately. Since the frequency is not specified, it is set to the value of the schedule period (20 seconds) by default.

ip sla monitor group schedule 1 3, 4, 6-10 schedule-period 20 start-time now

Figure 6:
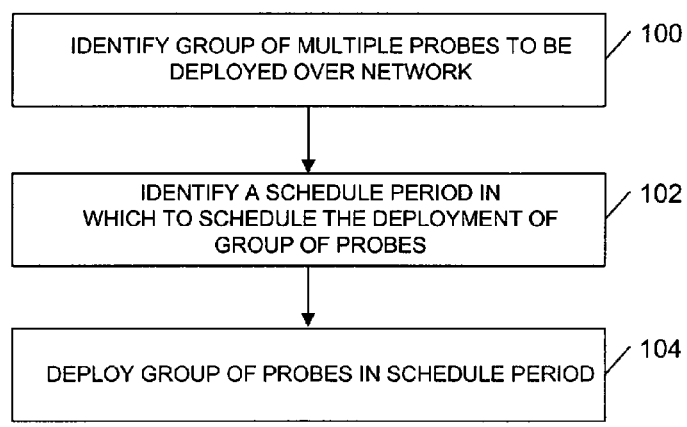
FIG. 6 is a high-level flow diagram illustrating a method of scheduling multiple probes for active or passive monitoring in accordance with an example embodiment.

The following example shows how operations 1 to 3 can be scheduled as a group (identified as group 2). In this example, the deployment of probes is scheduled to begin at random intervals over a schedule period of 50 seconds. The first operation is scheduled to start immediately. The random scheduler option is enabled and the frequency at which the group of operations will restart will be chosen randomly within the range of 80-100 seconds.

ip sla monitor group schedule 2 1-3 schedule-period 50 frequency range 80-100 start-time now The method in accordance with an example embodiment is now described, referring to FIG. 6. In operation 100, the scheduling set-up module 42 of the scheduling apparatus 40 identifies at least one group of multiple probes to be deployed in the network. These probes may be identified by the user defining a group number and probe identities, as discussed above.

As shown by operation 102, the scheduling set-up module 42, identifies a schedule period in which each of the probes forming part of the group of multiple probes is to be deployed. Again, the schedule period may be predefined by a user, or alternatively, the scheduling apparatus 40 may determine an effective schedule period based on the number of probes, the type of probes and further criteria that would be obvious to a person skilled in the art.

The SAA 18 may now obtain the scheduling information from the scheduling module 46 and deploy the group of multiple probes in the schedule period (operation 104).

Figure 7:
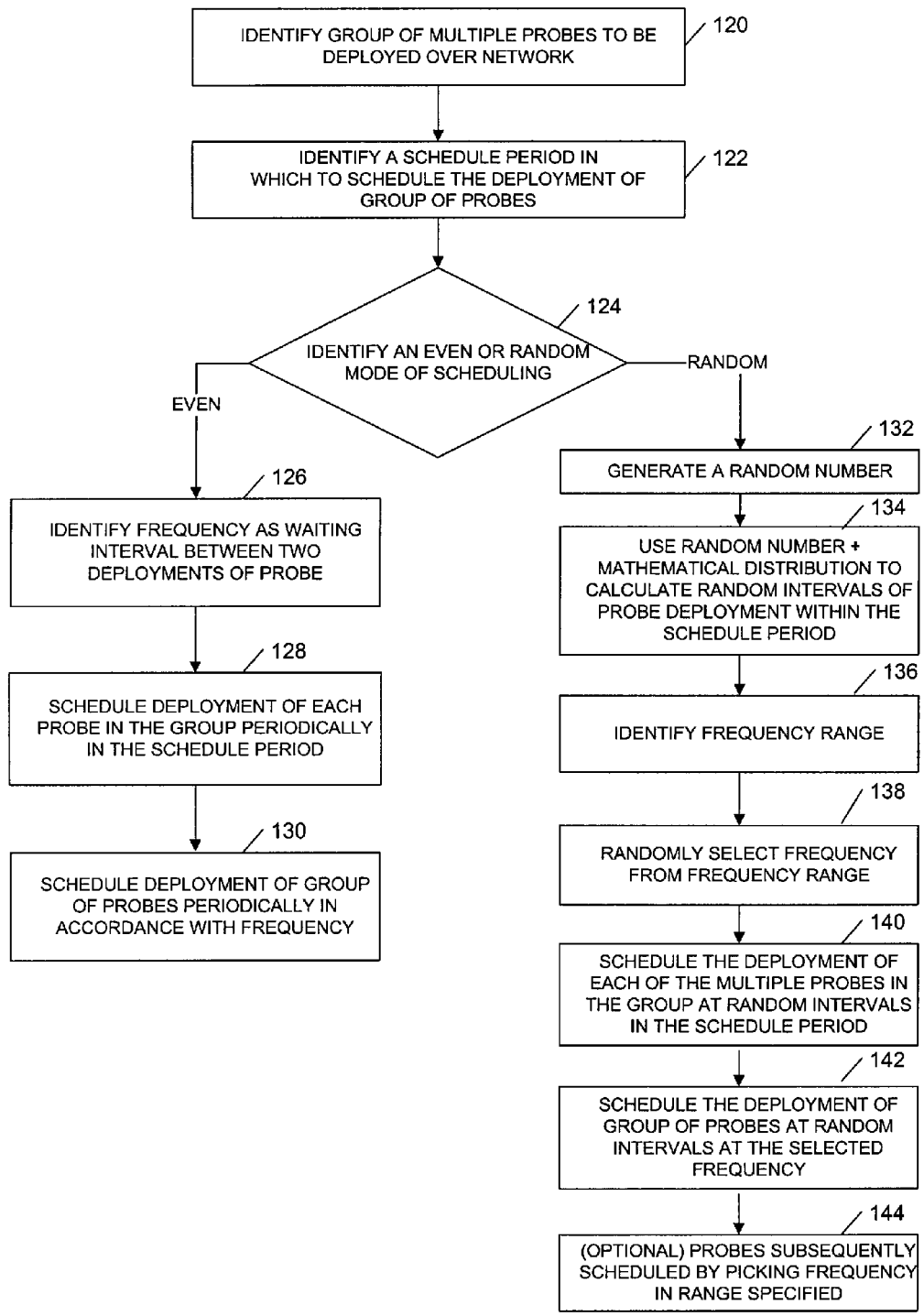
FIG. 7 shows a detailed flow diagram illustrating a method of scheduling multiple probes for active or passive monitoring in accordance with an example embodiment.

Turning to FIG. 7, a detailed flow diagram is shown which illustrates an example method of scheduling multiple probes in both even and random scheduling modes. Similar to FIG. 6, the method starts with the scheduling set-up module 42 identifying at least one group of multiple probes to be deployed in the network, in operation 120. In operation 122, the scheduling set-up module 42 identifies a schedule period in which each of the probes forming part of the group of multiple probes is to be deployed.

The scheduling set-up module 42 identifies an even or random mode of scheduling in operation 124. The mode of operation may be identified by either receiving a selection made by the user via the UI 48, or by a predetermined mode. As mentioned, if a user makes no selection of a scheduling mode, the scheduling apparatus 40 is defaulted to the even mode.

Scheduling in accordance with the even mode is described according to operations 126 to 130. In the even mode, the scheduling set-up module 42 identifies a frequency as the waiting interval between two deployments of a probe. This frequency may be user selected via the UI 48 or may be determined by the scheduling apparatus 40. For example, if no frequency is selected, the scheduling set-up module 42 selects the schedule period as the frequency.

In operation 128 the scheduling module 46 schedules the deployment of each of the probes in the group of probes periodically in the schedule period, while the group of probes is scheduled for deployment periodically at the specified frequency, as shown in operation 130.

Scheduling in accordance with the random mode is described according to operations 132 to 144. Once the random mode has been identified, a random number is generated by the random number generator 44, as shown in operation 132. The scheduling module 46 uses the random number and a mathematical distribution to calculate the random intervals of deployment within the schedule period for each of the multiple probes in the group (operation 134).

In operation 136, the scheduling set-up module 42 identifies a frequency range from which a frequency is to be randomly selected as the waiting interval between two deployments of each of the multiple probes in the group. The scheduling module 46, as shown in operation 138, now randomly selects the frequency as the waiting interval between two deployments of each of the multiple probes in the group, by combining a random number with the frequency range. This enables the scheduling module 46 to calculate the random frequency as the waiting interval between two deployments of each of the multiple probes in the group.

In operation 140, the scheduling module 46 schedules the deployment of each probe in the group of probes at random intervals within the schedule period, and in operation 142, the scheduling module 46 schedules the deployment of the group of probes at random intervals in accordance with the calculated frequency. In an example embodiment, the probes may then subsequently be scheduled by picking a frequency in the range specified (see block 144). In other words a frequency may be picked up from the range not just once but every time a probe in the group is to be scheduled.

The schedules for the deployment of the probes are communicated to the SAA 18 by the scheduling apparatus 40. The SAA 18 then deploys the probes forming part of the various groups, according to the schedules prepared by the scheduling apparatus 40.

Those of skill in the art will appreciate that the invention may be implemented in hardware, firmware or software, the last of these being the preferred embodiment for reasons of ease of transport, maintenance and upgrade. Those of skill will appreciate that the order in which certain functions are performed may vary. Such modifications are contemplated. Thus, any and all suitable means of realizing the invention are within the spirit and scope of the invention.

Figure 8:
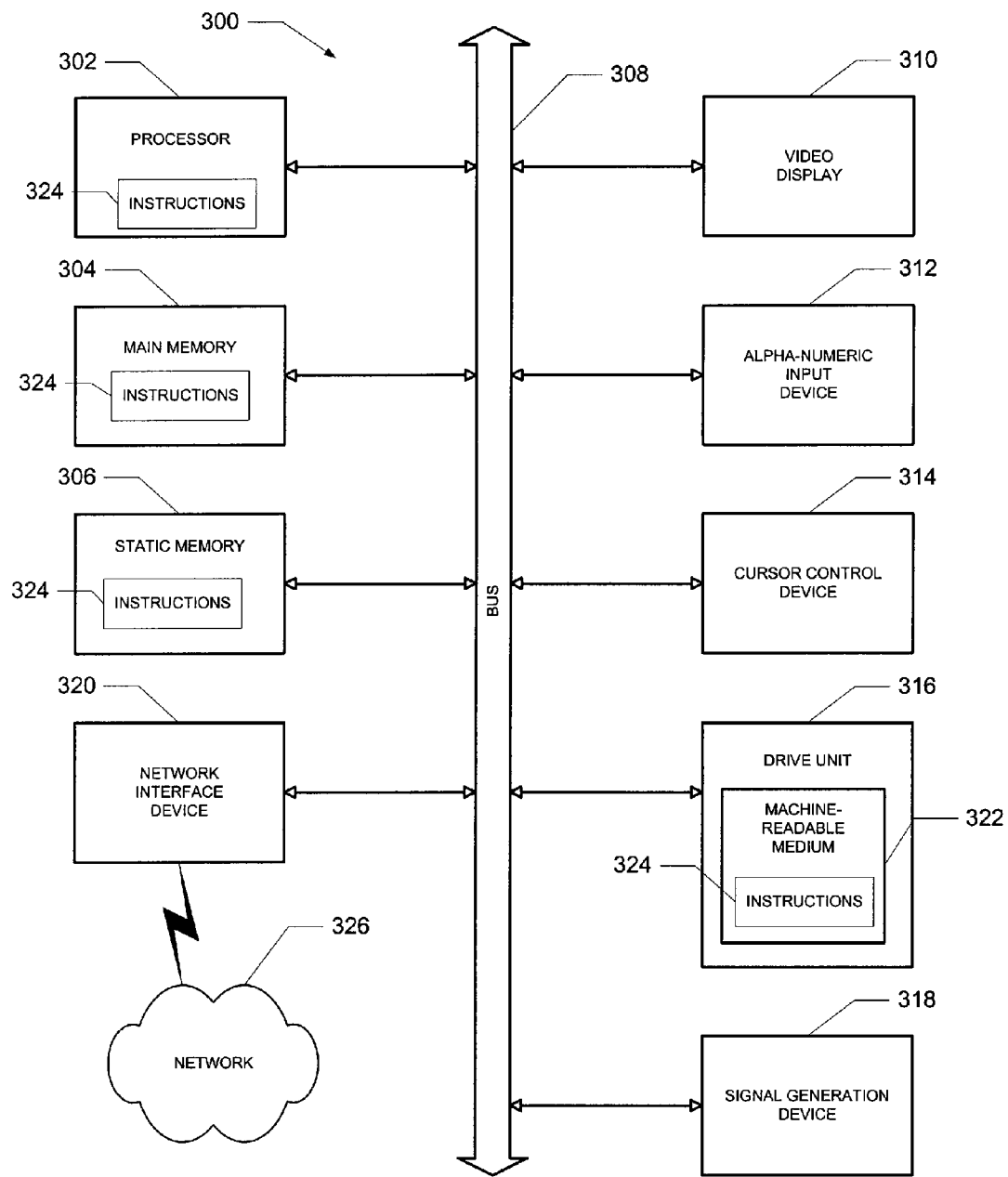
FIG. 8 is a block diagram showing a machine for performing any one of the exemplary methods described herein.

FIG. 8 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform anyone or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media.

Although an embodiment of the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of scheduling multiple probes in a network, the method comprising:
    identifying at least one group of multiple probes to be deployed in the network to measure multiple performance metrics in the network, each of the multiple probes comprising one or more data packets to be transmitted via the network, the group of multiple probes comprising two or more different types of probes, the two or more different types of probes being differently configured, to measure respective performance metrics;
    using one or more processors, scheduling the deployment of the group of multiple probes, as a group, at random intervals between successive deployments of the group of multiple probes; and
    deploying the group of multiple probes at the scheduled random intervals.

2. The method of claim 1, further comprising, for a further group of multiple probes:
    identifying one of an even or a random mode of scheduling; and
    in response to identifying the even mode of scheduling, scheduling deployment of the further group of probes periodically.

3. The method of claim 2, which comprises:
    in response to identifying the even mode of scheduling, scheduling the deployment of each probe in the further group of probes periodically in a schedule period.

4. The method of claim 1, wherein each of the multiple probes measures different performance metrics in the network.

5. The method of claim 1, which comprises:
    generating a random number and using a mathematical distribution to calculate the random intervals of probe deployment for each of the multiple probes in the group.

6. The method of claim 5, wherein the mathematical distribution is one of a uniform distribution, an exponential distribution, and a Poisson distribution.

7. The method of claim 1, further comprising identifying a frequency range from which a frequency indicative of a waiting interval between two deployments of each of the multiple probes in the group is to be randomly selected, and scheduling the group of probes at random intervals based on a randomly selected frequency.

8. The method of claim 7, which comprises:
    combining a random number with the frequency range to calculate the random frequency indicative of the waiting interval between two deployments of each of the multiple probes in the group.

9. The method of claim 8, wherein the waiting interval corresponding to the starting value of the frequency range is greater than timeout values of each of the probes in the group.

10. The method of claim 8, wherein the waiting interval corresponding to the starting value of the frequency range is greater than a schedule period within which the multiple probes of the group are deployed.

11. The method of claim 7, wherein the frequency range is predefined.

12. A method of scheduling probes in a network, the method comprising:
    identifying at least one group of probes to be deployed in the network to measure multiple performance metrics in the network, each of the multiple probes comprising one or more data packets to be transmitted via the network, the group of multiple probes comprising two or more different types of probes, the two or more different types of probes being differently configured, to measure respective performance metrics;
    identifying a schedule period in which to schedule the deployment of the group of probes;
    using one or more processors, scheduling the deployment of each probe in the group of probes at random intervals within the schedule period; and
    scheduling deployment of the group of probes, as a group, at random intervals between successive deployments of the group of probes.

13. A scheduling apparatus to schedule multiple probes in a network, the apparatus comprising:
    a scheduling set-up module to identify at least one group of multiple probes to be deployed in the network to measure multiple performance metrics in the network, each of the multiple probes comprising one or more data packets to be transmitted via the network, the group of multiple probes comprising two or more different types of probes, the two or more different types of probes being differently configured, to measure respective performance metrics; and
    a scheduling module to schedule the deployment of the group of multiple probes, as a group, at random intervals between successive deployments of the group of multiple probes.

14. The scheduling apparatus of claim 13, wherein the scheduling set-up module is to:
    identify an even mode of scheduling or a random mode of scheduling for respective groups of probes; and responsive to identifying the random mode of scheduling for a particular group of probes, schedule the deployment of the particular group of multiple probes, as a group, at the random intervals.

15. The scheduling apparatus of claim 14, wherein the scheduling set-up module is to schedule deployment of another group of probes periodically in response to identifying the even mode of scheduling.

16. The scheduling apparatus of claim 15, wherein the scheduling set-up module is to:
schedule the deployment of each probe in the particular group of probes periodically in respective schedule periods in response to identifying the even mode of scheduling; and
schedule the deployment of each probe in the other group of probes at random intervals within respective schedule periods in response to identifying the random mode of scheduling.

17. The scheduling apparatus of claim 15, the scheduling set-up module is to schedule the deployment of each probe in the other group of probes periodically in respective schedule periods and schedule the deployment of the group of probes periodically.

18. The scheduling apparatus of claim 13, wherein each of the multiple probes measures different performance metrics in the network.

19. The scheduling apparatus of claim 18, wherein a random number is generated and using a mathematical distribution to calculate the random intervals of probe deployment within the schedule period for each of the multiple probes in the group.

20. The scheduling apparatus of claim 13, wherein the scheduling set-up module is to identify a frequency range for which a frequency indicative of the waiting interval between two deployments of each of the multiple probes in the group is to be randomly selected, and to schedule the group of probes at the random intervals in accordance with a randomly selected frequency.

21. The scheduling apparatus of claim 20, wherein the scheduling set-up module is to combine a random number with the frequency range to calculate the random frequency as indicative of the waiting interval between two deployments of each of the multiple probes in the group.

22. The scheduling apparatus of claim 21, wherein the waiting interval corresponding to the starting value of the frequency range is greater than timeout values of each of the probes in the group.

23. The scheduling apparatus of claim 21, wherein the waiting interval corresponding to the starting value of the frequency range is greater than a schedule period within which the multiple probes of the group are deployed.

24. A scheduling apparatus to schedule multiple probes to monitor a network, the apparatus comprising:
first means for identifying at least one group of multiple probes to be deployed in the network to measure multiple performance metrics in the network, each of the multiple probes comprising one or more data packets to be transmitted via the network, the group of multiple probes comprising two or more different types of probes, the two or more different types of probes being differently configured, to measure respective performance metrics; and
second means for scheduling the deployment of the group of multiple probes, as a group, at random intervals between successive deployments of the group of multiple probes.

25. A non-transitory machine-readable medium embodying instructions which, when executed by a machine, cause the machine to:
identify at least one group of multiple probes to be deployed in the network to measure multiple performance metrics in the network, each of the multiple probes comprising one or more data packets to be transmitted via the network, the group of multiple probes comprising two or more different types of probes, the two or more different types of probes being differently configured, to measure respective performance metrics;
schedule the deployment of the group of multiple probes, as a group, at random intervals between successive deployments of the group of multiple probes; and
deploy the group of multiple probes at the scheduled random intervals.

* * * * *